United States Patent [19]
Ikeda

[11] Patent Number: 5,612,004
[45] Date of Patent: Mar. 18, 1997

[54] EXHAUST GAS PROCESSING SYSTEM

[75] Inventor: Toshio Ikeda, Sagamihara, Japan

[73] Assignee: Nessy Kogyo Kabushiki Kaisha, Kanagawa-ken, Japan

[21] Appl. No.: 369,696

[22] Filed: Jan. 6, 1995

[30] Foreign Application Priority Data

Oct. 11, 1994 [JP] Japan .................................. 6-245606

[51] Int. Cl.⁶ .................................................. B01D 53/34
[52] U.S. Cl. ................. 423/240.5; 422/177; 422/178; 422/211; 422/171; 55/212; 95/287; 423/244.07
[58] Field of Search .................................. 422/169–171, 422/177–178, 188, 189, 190, 211, 223; 502/439, 527; 423/244.07, 244.08, 212 R; 435/299.1; 210/275, 279; 55/212; 95/292

[56] References Cited

U.S. PATENT DOCUMENTS

| | | | |
|---|---|---|---|
| 1,345,220 | 6/1920 | Nielsen | 423/244.07 |
| 2,155,853 | 4/1939 | Anthony, Jr. | 422/169 |
| 2,878,107 | 3/1959 | Ruth | 423/212 |
| 3,557,955 | 1/1971 | Hirs et al. | 210/279 |
| 3,960,507 | 6/1976 | Tsujikawa et al. | 422/172 |
| 4,764,348 | 8/1988 | Furlong | 422/178 |
| 4,917,802 | 4/1990 | Fukaya et al. | 210/605 |

Primary Examiner—Robert J. Warden
Assistant Examiner—Hien Tran
Attorney, Agent, or Firm—Paul A. Guss

[57] ABSTRACT

In order to economically remove harmful components in exhaust gases by using a simple and extremely durable system, an exhaust gas to be treated is introduced into a neutralizing tower provided with a first duct and a second duct. Harmful components in the exhaust gas chemically react with a neutralizing agent randomly stacked within the neutralizing tower, and such components become deposited on the surface of the neutralizing agent. Water is supplied from a water supply pipe to the surface of the neutralizing agent by driving a pump after passage of a predetermined period of time, and the surface of the neutralizing agent is washed thereby. Additional exhaust gases are further fed and reacted with the neutralizing agent, which has a renewed surface exposed again. The neutralizing agent can thus be repeatedly used for removal of harmful components in the exhaust gases.

9 Claims, 3 Drawing Sheets

EXHAUST GAS PROCESSING SYSTEM

BACKGROUND OF THE INVENTION

1. Field of the Invention

The present invention relates to an exhaust gas processing system, and in particular relates to an exhaust gas processing system in which harmful components in exhaust gases generated upon incineration of vinyl chloride and the like are neutralized and released to atmosphere, and wherein processing of such exhaust gases is enabled by washing and repeatedly using a neutralizing agent.

2. Description of the Related Art

At present, general and industrial waste is processed either by burying the waste or through incineration. A relatively large amount of macromolecular compounds including vinyl chloride are contained in the waste. It is often pointed out correctly that harmful gases are released into the atmosphere due to burning of such waste materials.

Trials have hitherto been made to decrease such harmful gases as low as possible. For example, in a wet neutralizing tower, neutralization is achieved by spraying an aqueous alkali dissolved in water onto the harmful components, such as hydrogen chloride, contained in exhaust gases. However, in the case of such a wet neutralizing tower, the processing system itself is relatively expensive, handling of the system is troublesome, and the amount of exhaust gas supplied from an incinerator side of the system in not specified. As a result, it is impossible to recognize the degree at which harmful components are contained in the exhaust gas. Thus, it is also impossible to specify a proper amount of an aqueous alkali to be supplied to the inside of the wet neutralizing tower, inevitably resulting in complicated processing operations. Further, the equipment constituting the neutralizing tower is subjected to extremely accelerated corrosion, and the like, due to alkaline components, and consequently a drawback arises in durability of the equipment.

SUMMARY OF THE INVENTION

The present invention has been made in order to overcome the disadvantages described above. It is an object of the present invention to provide an exhaust gas processing system having both a simple construction and excellent durability, in which a neutralizer capable of repeated use is used, and whereby the running cost of the system can be kept inexpensive.

In order to achieve the objects described above, the present invention comprises an exhaust gas processing system comprising a first duct which communicates with an exhaust port of an incinerator generating an exhaust gas, a neutralizing tower to which the first duct is connected, and a second duct which is connected to a discharge port of the neutralizing tower, and wherein;

a water supply means is arranged on the inside of the neutralizing tower, a large number of pellet-shaped pieces of a neutralizing agent are charged into the neutralizing tower, and components in the exhaust gas introduced from the first duct are reacted with the neutralizing agent in the neutralizing tower and discharged to the outside from the second duct, and further wherein;

the water supply means is energized after passage of a predetermined period of time to supply water to the inside of the neutralizing tower, whereby reacted components deposited on a surface of the neutralizing agent are removed.

The exhaust gas introduced from the first duct contacts with the neutralizing agent made up of a large number of pellet-shaped pieces in the neutralizing tower. At this time, the exhaust gas forms a turbulent flow and rises in the neutralizing tower because the neutralizing agent is randomly and sufficiently charged in the neutralizing tower. Further, harmful gases contained in the exhaust gas, for example gases containing HCl generated after the incineration of vinyl chloride and the like, react with the neutralizing agent and become neutralized, and the reacted components are deposited on the surface of the neutralizing agent. The exhaust gas itself, having been neutralized and made harmless in such a manner, is discharged to the outside through the second duct.

On the other hand, the reacted components deposited on the neutralizing agent are removed from the surface layer of the neutralizing agent by water, which is vigorously jetted from the water supply means, after the passage of a predetermined period of time, and such reacted components naturally fall toward a lower portion of the neutralizing tower. The reacted components are then removed from the lower portion of the neutralizing tower. The neutralizing agent acquires a renewed reactive surface which is exposed to the space within the neutralizing tower, and the system waits in preparation for the next exhaust gas processing.

BRIEF DESCRIPTION OF THE DRAWING

A preferred embodiment of the exhaust gas processing system according to the present invention shall be explained in detail below with reference to the attached drawings, wherein.

BRIEF DESCRIPTION OF THE PREFERRED EMBODIMENT

Figure 1:
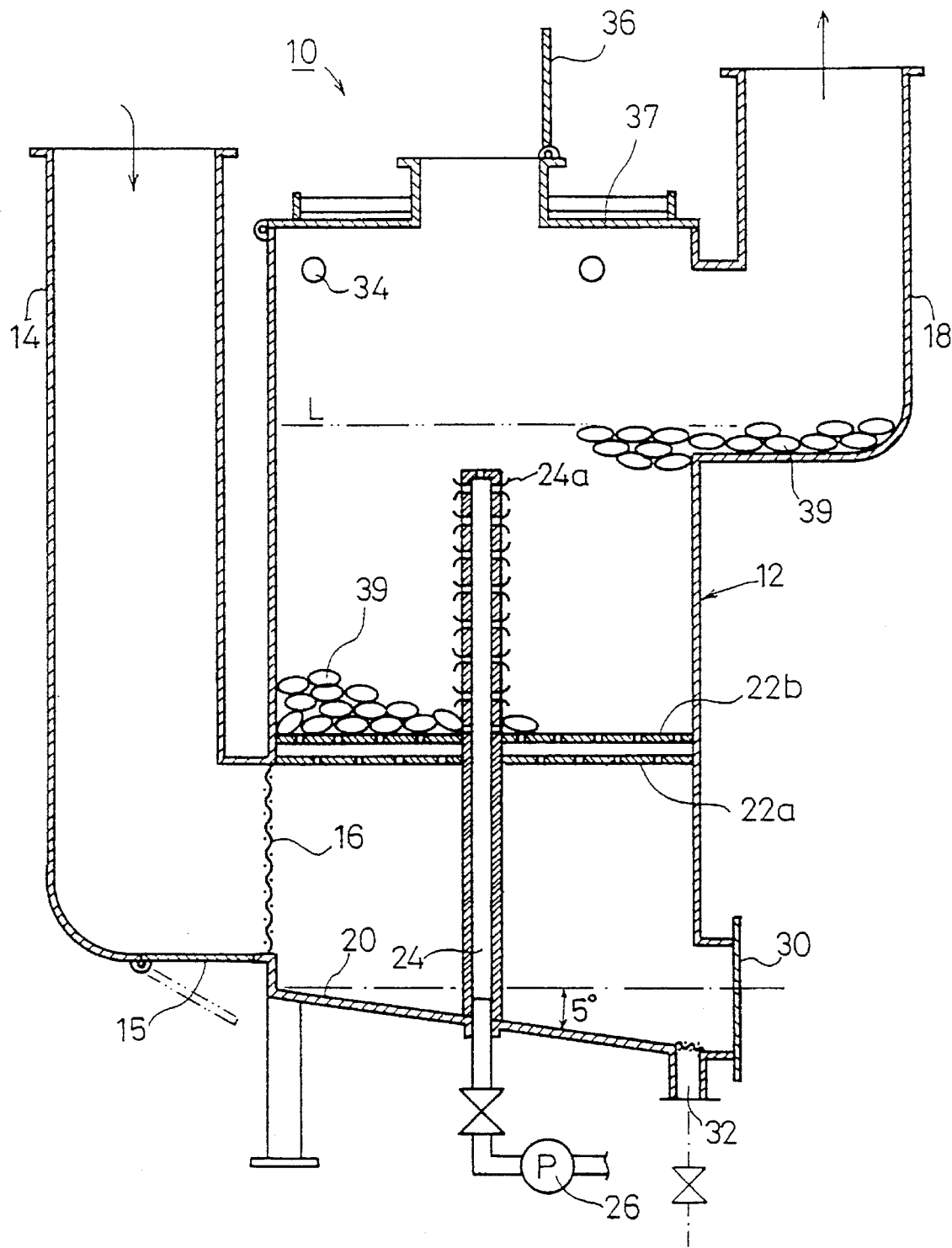
FIG. 1 is a schematic cross-sectional explanatory view of an exhaust gas processing system according to the present invention.

Reference numeral 10 in FIG. 1 shows an exhaust gas processing system according to the present invention. The exhaust gas processing system 10 includes a cylindrical neutralizing tower 12. A seamless first duct 14, which communicates with an exhaust gas outlet of an incinerator (not shown), is connected to a lower portion of the neutralizing tower 12. The first duct 14 faces a bottom portion of the neutralizing tower 12, and a connecting port therebetween is provided with a net member 16 having a relatively fine mesh size. A lid member 15 which can be freely opened or closed is provided at a bottom portion of the first duct 14, and is used to take out and remove relatively large dust trapped by the net member 16. A second duct 18, for discharging harmless exhaust gas to the outside after reaction and processing in the neutralizing tower 12, is provided at an upper side wall of the neutralizing tower 12. The bottom of the neutralizing tower 12 has an inclined bottom plate 20, as illustrated, wherein the bottom plate 20 is selected to have an inclination angle of about 5 degrees with respect to the horizontal plane. Two layers of perforated metals 22a, 22b are arranged over the bottom plate 20. A water supply pipe 24 extends upward from an approximately central portion of the bottom plate 20 along the axis of the neutralizing tower 12. A large number of holes are pierced through a cylindrical circumferential wall of the water supply pipes 24, and nozzles 24a are installed on the holes. A pump 26 is inserted into a lower end portion of the water supply pipe 24. Washing water is forcibly supplied by the pump 26 from the water supply pipe 24 to the inside of the neutralizing tower 12.

A cleaning port 30 and a drain withdrawal hole 32 are provided at bottom portions of the neutralizing tower 12. Holes 34 for discharging overflowing washing water to the outside, and a lid member 37 including an explosion-proof valve 36 which closes an upper opening of the neutralizing tower 12 and which can be optionally and freely opened and closed, are provided at upper portions of the neutralizing tower 12.

Figure 2:
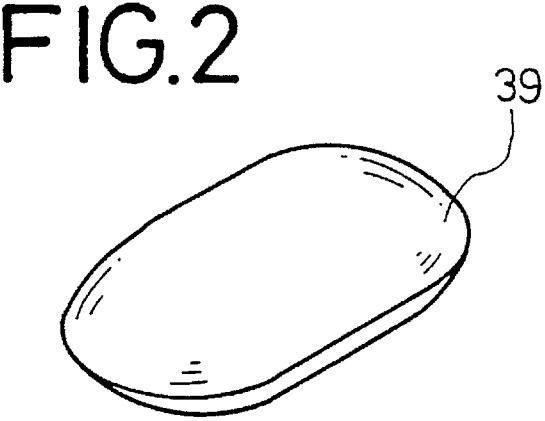
FIG. 2 is a perspective explanatory view of a pellet to be used for the exhaust gas processing system according to the present invention.
Figure 3:
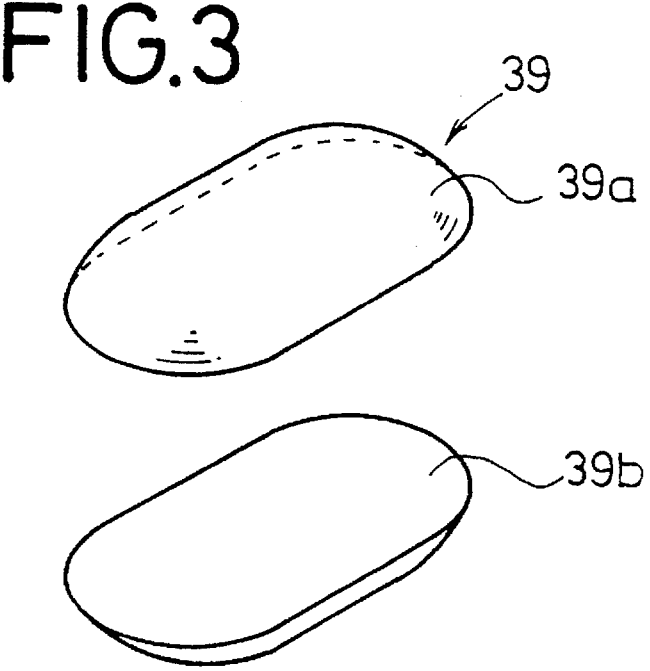
FIG. 3 is a perspective explanatory view of another embodiment of the pellet shown in FIG. 2.

Upon use of the construction as described above, a neutralizing agent 39 is charged to the inside of the neutralizing tower 12 up to a level L. The neutralizing agent 39 preferably comprises almond-shaped pellets (see FIG. 2), composed from raw materials of slaked lime ($Ca(OH)_2$), cement and water. Preferably, slaked lime is 70–90% by weight, cement is 5–25% by weight, and water is 5–25% by weight. These raw materials are mixed and kneaded in a mill, the mixed and kneaded neutralizing components are pressurized and molded at a pressure of 100–200 kg/cm$^2$, and are naturally dried. Because cement is added to the neutralizing agent 39, advantageous effects are obtained in that the strength of the pellets by far increases as compared with a single molding of slaked lime, and the pellets are prevented from collapsing during the neutralization reaction. When pieces of the neutralizing agent 39 thus formed are charged to the inside of the neutralizing tower 12 up to the level L, gaps between the pellets make up 15–20% of the total volume occupied by the pallets. In this case, the almond-shaped pellet 39, as shown in FIG. 2 may also be divided in two along a longitudinal direction thereof to form divided halves of pellet pieces 39a, 39b. By doing so, the contact area between the pallets 39 and the exhaust gas increases, when the exhaust gas enters the neutralizing tower 12, as described in more detail below.

The exhaust gas processing system according to the present invention is basically constituted as described above. Next, its operation will be explained.

An exhaust gas discharged from an incinerator (not shown) is introduced into the neutralizing tower 12 through the first duct 14. During this time, the net member 16 removes dust larger in size than the mesh size of the net member. The exhaust gas introduced into the neutralizing tower 12 passes through the perforated metals 22a, 22b, which are aligned with their holes formed alternately to one another, and the gas forms a turbulent flow and diffuses into the neutralizing tower 12 thoroughly.

The exhaust gas comes into contact with the surface of the neutralizing agent 39 because of the gaps formed between adjacent pieces of the neutralizing agent 39, which make up 15–20% of the total volume occupied by the pellets 39. With respect to the reaction between the neutralizing agent 39 and the exhaust gas, for example, $CaCl_2$ is generated after processing when HCl is contained in the exhaust gas, and $CaSO_3$ is generated when $SO_2$ is contained in the exhaust gas, after the exhaust gas has passed through the neutralizing agent 39. Therefore, only a substantially harmless exhaust gas is discharged to the outside through the second duct 18. The reacted components, as described above, are gradually deposited on the surface of the neutralizing agent 39. The pump is energized after the passage of a predetermined period of time. As a result, water passes through the water supply pipe 24, and is vigorously jetted through nozzles to the inside of the neutralizing tower 12. The reacted components on the surface of the neutralizing agent 39 are washed by the forcibly fed water, and gradually accumulate on the bottom plate 20 having an inclination angle of about 5 degrees. The reacted components, having been washed and accumulated on the bottom plate 20, are of course also harmless, and are removed by opening the cleaning port 30. Additional exhaust gases are then fed through the first duct 14 to the neutralizing agent 39, which has a new reaction surface exposed thereon due to the spraying of washing water.

When a gradual decrease in the neutralizing agent 39 is confirmed, for example, the lid member 37 including the explosion-proof valve 36 is opened, and new pieces of the neutralizing agent 39 may be introduced into the neutralizing tower 12. Overflow holes 34 are provided for discharging excess water when the water for washing the neutralizing agent supplied from the water supply pipe 24 exceeds the height of the overflow holes.

Figure 4:
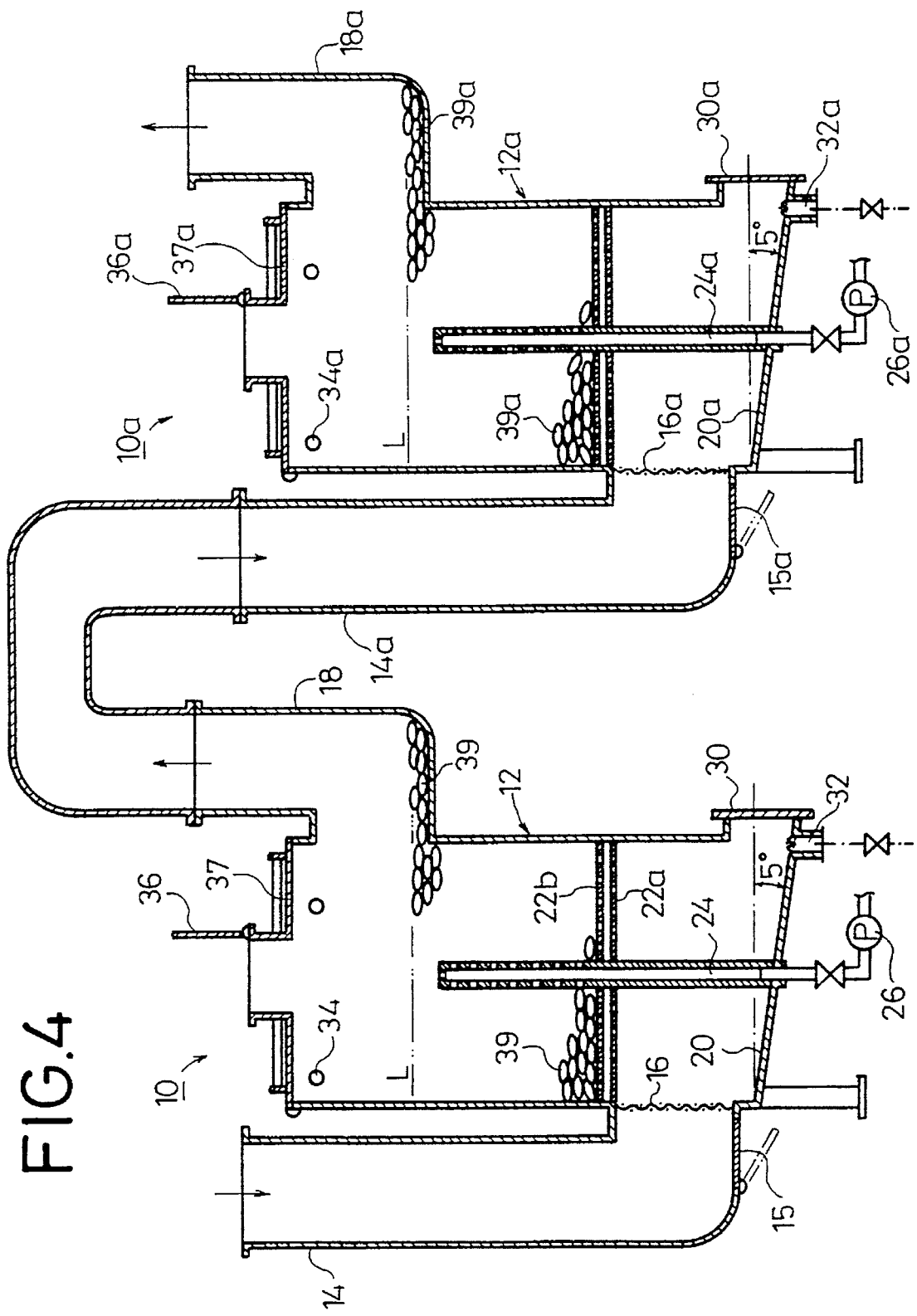
FIG. 4 is a schematic cross-sectional explanatory view of another embodiment of the exhaust gas processing system according to the present invention.

Another embodiment of the present invention is shown in FIG. 4. As easily comprehended from FIG. 4, this embodiment comprises a second exhaust gas processing system 10a having the same construction as that of the exhaust gas processing system 10, connected in series with the exhaust gas processing system 10. Thus the same constituent elements as those of the exhaust gas processing system 10 are represented by adding "a" to the reference numerals in the exhaust gas processing system 10a, and detailed explanation thereof is omitted.

When two exhaust gas processing systems 10 and 10a are connected in series, the second duct 18 of the exhaust gas processing system 10 constituting a first stage is connected to the first duct 14a of the exhaust gas processing system 10a constituting a second stage. In this arrangement, the net member 16a of the exhaust gas processing system 10a of the second stage may be of a finer mesh than the net member 16 of the exhaust gas processing system 10 of the first stage, and hence finer dust can be trapped by the net member 16a. On the other hand, if dust is sufficiently trapped by the net member 16 of the exhaust gas processing system 10 of the first stage, it is unnecessary to install any net member in the exhaust gas processing system 10a of the second stage.

In the embodiment described above, the exhaust gas processing system 10a of the second stage neutralizes and processes exhaust gas discharged from the second duct 18 of the exhaust gas processing system 10 of the first stage, in the same manner as the exhaust gas processing system 10 of the first stage.

Results of experiments run using the above-described systems are shown in Table 1. In these experiments, hydrogen chloride gas was supplied in first through fourth trials, and its recovery ratios were measured. In each experiment, gas could be recovered at an efficiency of 90% or more.

TABLE 1

|  | First | Second | Third | Fourth |
| --- | --- | --- | --- | --- |
| Inlet (HCl, mg/Nm$^3$) | 4208 | 631 | 2879 | 6732 |

TABLE 1-continued

|  | First | Second | Third | Fourth |
|---|---|---|---|---|
| Outlet (HCl, mg/Nm³) | 259 | 43 | 283 | 342 |
| Efficiency (%) | 93.8 | 93.2 | 90.2 | 94.9 |

According to the present invention, harmful components in exhaust gases can be sufficiently removed using a neutralizing agent in a dry state as described above. Further, the neutralizing agent can be thoroughly brought into contact with the exhaust gas because it is stacked sufficiently and randomly within the neutralizing tower. Thus, harmful components in exhaust gases can be effectively removed owing to chemical reactions with the neutralizing agent.

Further, reacted components are removed from the surface of the neutralizing agent by washing water supplied from the water supply means, and a renewed reactive surface can be exposed. Consequently, the neutralizing agent can be used repeatedly. The present invention has an extremely simple construction, and is excellent in durability when compared with the prior art. Thus an effect is obtained in that it is extremely economic to implement and use.

What is claimed is:

1. An exhaust gas processing system comprising:

a first duct for communicating with an exhaust port of an incinerator which generates an exhaust gas;

a neutralizing tower to which said first duct is connected;

a second duct which is connected to a discharge portion of said neutralizing tower;

a water supply means arranged inside said neutralizing tower, said water supply means comprising a water supply pipe disposed on and extending vertically upright from a bottom wall of said neutralizing tower; and a plurality of individual pieces of a neutralizing agent charged to a predetermined depth inside said neutralizing tower, said individual pieces being in contact with and surrounding said water supply pipe, wherein the exhaust gas is introduced from said first duct, and toxic components in said exhaust gas react with said individual pieces of the neutralizing agent in said neutralizing tower, and a neutralized exhaust gas is discharged to atmosphere from said second duct, and wherein water is supplied by said water supply means to the inside of said neutralizing tower after passage of a predetermined period of time, and said water supply pipe having a plurality of openings to spray water to the individual pieces of the neutralizing agent to react with and remove components deposited on surfaces of said neutralizing agent, for exposing renewed surfaces on said pieces of the neutralizing agent.

2. The exhaust gas processing system according to claim 1, wherein said water supply pipe includes a plurality of nozzles installed on said water supply pipe, and further comprising a pump for forcibly supplying water to said water supply pipe.

3. The exhaust gas processing system according to claim 1, wherein said individual pieces of said neutralizing agent are pellet-shaped.

4. The exhaust gas processing system according to claim 1, wherein said individual pieces of said neutralizing agent comprise pellet-shaped pieces which are divided into two halves.

5. The exhaust gas processing system according to claim 1, wherein said neutralizing tower comprises a cylindrical container, and wherein said water supply pipe is disposed along a vertical axis of said container.

6. The exhaust gas processing system according to claim 2, wherein said neutralizing tower comprises a cylindrical container, and wherein said water supply pipe is disposed along a vertical axis of said container.

7. The exhaust gas processing system according to claim 1, wherein said individual pieces of the neutralizing agent comprise naturally dried pellet-shaped pieces made up from a slurry of 70–90% by weight of slaked lime, 5–25% by weight of cement and 5–25% by weight of water.

8. A method for processing an exhaust gas, comprising the steps of:

providing a water supply means arranged inside a neutralizing tower, said water supply means comprising a water supply pipe disposed on and extending vertically upright from a bottom wall of said neutralizing tower, said water supply pipe having a plurality of openings therein through which water is discharged;

charging a plurality of pellet-shaped pieces of a neutralizing agent into said neutralizing tower to a predetermined depth, such that said pellet-shaped pieces are in contact with and surround said water supply pipe;

supplying an exhaust gas to said neutralizing tower through a first duct which communicates with an exhaust port of an incinerator;

passing said exhaust gas upwardly through said neutralizing agent to cause said exhaust gas to react therewith and remove toxic components from said exhaust gas, said toxic components depositing on said pieces of the neutralizing agent;

discharging a neutralized exhaust gas to atmosphere from said neutralizing tower through a second duct disposed vertically above said neutralizing agent; and after a predetermined passage of time, supplying water into said neutralizing tower through said water supply pipe to wash said pieces of the neutralizing agent and remove the deposited components, thereby exposing a renewed reactive surface on said pieces of the neutralizing agent.

9. An exhaust gas processing system comprising:

a first duct for communicating with an exhaust port of an incinerator which generates an exhaust gas;

a first neutralizing tower to which said first duct is connected;

a second duct which is connected to a discharge portion of said first neutralizing tower;

a third duct which communicates with said second duct;

a second neutralizing tower to which said third duct is connected;

a fourth duct which is connected to a discharge portion of said second neutralizing tower;

first and second water supply means arranged respectively inside said first and second neutralizing towers, each of said first and second water supply means comprising a water supply pipe disposed on and extending vertically upright from bottom walls of said first and second neutralizing towers, respectively; and a plurality of individual pieces of a neutralizing agent charged to a predetermined depth inside said first and second neutralizing towers, said individual pieces being in contact with and surrounding said first and second water supply pipes, wherein the exhaust gas is introduced from said first duct, and toxic components in said exhaust gas react with said individual pieces of the neutralizing agent in said first and second neutralizing towers, and a neutralized exhaust gas is discharged to atmosphere from said fourth duct, and wherein water is supplied by said first and second water supply means to the inside of said first and second neutralizing towers after passage of a predetermined period of time, and said water supply pipes having a plurality of openings to spray water to the individual pieces of the neutralizing agent to react with and remove components deposited on surfaces of said neutralizing agent, for exposing renewed surfaces on said pieces of the neutralizing agent.

* * * * *